United States Patent [19]
Talbert

[11] 3,802,161

[45] Apr. 9, 1974

[54] HUMIDIFIER

[76] Inventor: Norwood K. Talbert, 7586 Cavalry Cir., Manlius, N.Y. 13104

[22] Filed: July 31, 1972

[21] Appl. No.: 276,645

[52] U.S. Cl.............. 55/226, 55/241, 261/109, 261/111, 261/118
[51] Int. Cl............................................. B01f 3/04
[58] Field of Search ............ 261/63; 55/226, 241; 261/63, 109, 111, 118

[56] References Cited
UNITED STATES PATENTS

| | | |
|---|---|---|
| 2,750,173 | 6/1956 | Hartmann et al.................. 261/111 |
| 2,974,936 | 3/1961 | Ackeren et al..................... 261/111 |
| 3,395,656 | 8/1968 | Ford et al............................ 261/111 |
| 3,648,440 | 3/1972 | Egan.................................... 55/226 |
| 3,664,094 | 5/1972 | Barkovitz et al................... 261/109 |
| 3,699,748 | 10/1972 | Barkovitz............................ 261/109 |

Primary Examiner—Frank W. Lutter
Assistant Examiner—Steven H. Markowitz
Attorney, Agent, or Firm—Charles S. McGuire

[57] ABSTRACT

Apparatus for increasing relative humidity by directing the air to be humidified through a housing, from bottom to top, while spraying a water curtain from a nozzle centrally located in an upper portion of the casing to a surrounding vertical wall. The water droplets fall from the wall to a series of cone frustrums and a funnel connected to a drain pipe. A significant amount of the air passing through the housing is caused to pass through the cones and vertical wall, whereby the air picks up moisture and the water removes dust particles, and the like, from the air. A baffle system is provided to control the proportions of air passing through the inside and outside of the cones and vertical wall.

9 Claims, 1 Drawing Figure

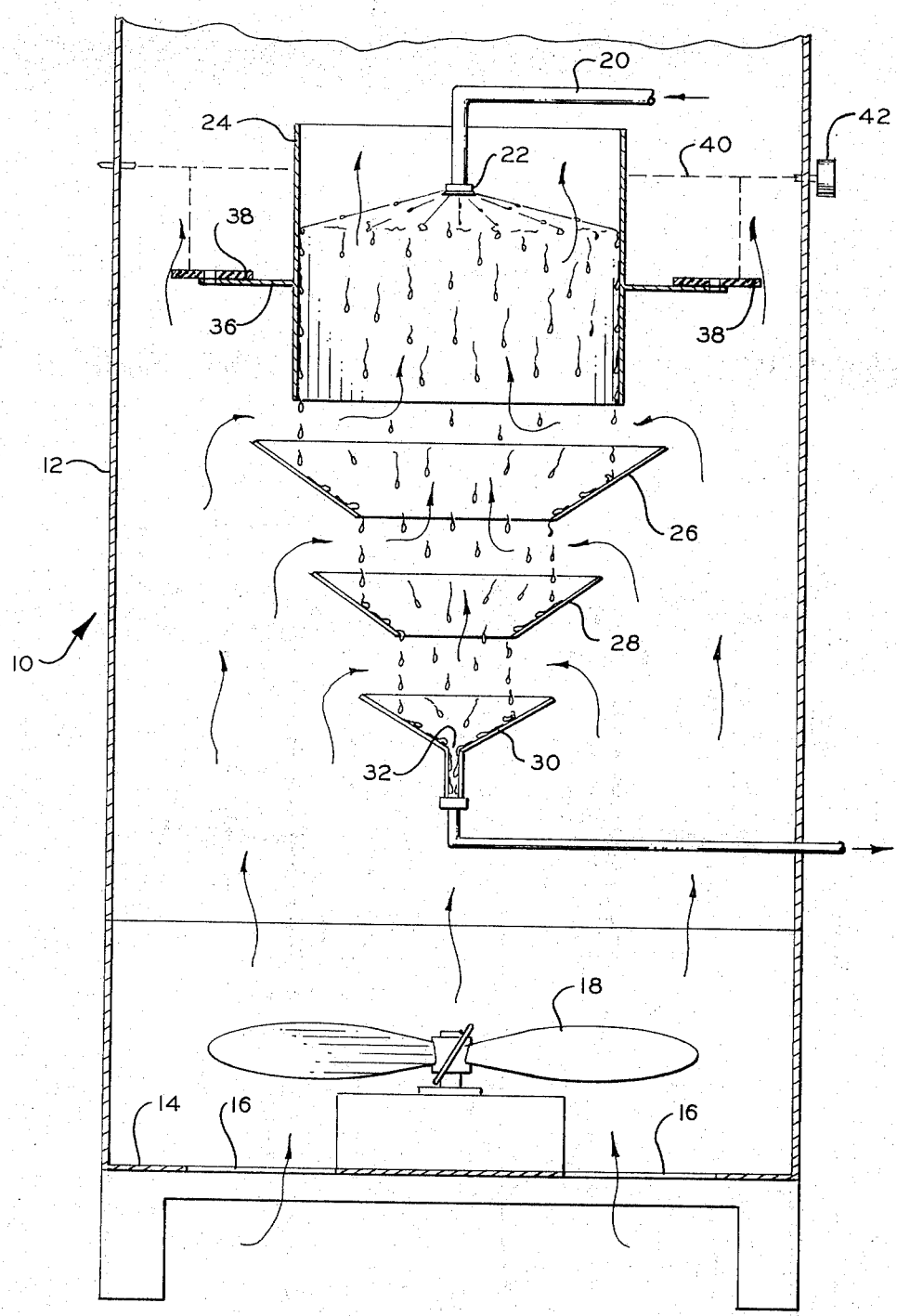

HUMIDIFIER

BACKGROUND OF THE INVENTION

This invention relates to humidifying and filtering systems and, more particularly to apparatus employing a water spray to effect simultaneous humidification and filtering of dust particles, and the like, of an air stream passing therethrough.

The advantage of adding moisture to an extremely dry atmosphere are well recognized. This is especially apparent in the heating of enclosed spaces since the relative humidity of the air drops as the temperature is increased without change in the absolute moisture content. Thus, it has become a common practice to increase relative humidity by adding moisture by means of various humidification apparatus. Among such apparatus are individual humidifier units suitable for use in private homes, or enclosed spaces of comparable size.

While the basic objective of any humidification system is to increase the moisture content of the air, preferably in a controlled manner, and even more preferably, controlled in such a way as to have a decreasing rate of moisture increase as the air approaches saturation, an associated desire, particularly from a respiratory ailment standpoint, is to remove extremely fine dust particles that have a tendency to build up in any closed building — dust particles that are difficult if not impossible to remove by conventional filtering systems.

A principal object of the present invention is to provide a simple and inexpensive apparatus which will simultaneously humidify dry air and remove dust and other fine particulate matter therefrom.

A further object is to provide a humidification system which approaches, but never reaches complete saturation of the air passing therethrough, the operating principle of the apparatus serving to regulate the rate of addition of moisture automatically.

Still another object is to provide a combined humidifying and filtering apparatus utilizing a water spray with means to substantially reduce problems of sediment and corrosion.

A still further object is to provide a novel and improved humidifier-air filter equally suited for employment in the plenum chamber of a hot air furnace or as an independent unit.

Other objects will in part be obvious and in part appear hereinafter.

SUMMARY OF THE INVENTION

In accordance with the foregoing objects, the invention comprises means for directing a water spray outwardly from a central nozzle against a surrounding vertical wall. The water runs down and off the interior of the wall into the open upper end of a cone frustrum positioned directly below. The lower end of the cone is also open for a substantial diameter and another cone, similar to but smaller than the first, is positioned therebelow. A number of such vertically spaced, coaxial cones are provided with the lowermost serving as a funnel to direct the water not picked up by the air circulated through the unit to a drain line. A powered fan is provided to assist in circulating air through the unit and a baffle system to control the proportion of air passing through the water spray and that passing outside.

An outer housing is provided to contain the elements and, in the disclosed embodiment the air is drawn in through the bottom and passes out through the top of the housing, although flow in the opposite direction is possible. The spacing between the outer housing and the outer dimensions of the elements through which the water spray passes, as modified by the aforementioned baffle system, has an effect on the amount of moisture picked up by the air by determining the proportion thereof passing through the water spray.

BRIEF DESCRIPTION OF THE DRAWING

The single FIGURE is a diagrammatic, elevational view of a humidifier constructed according to the present invention in vertical section through the center.

DETAILED DESCRIPTION

Outer housing 10 comprises an enclosure of vertical walls 12, of any desired cross-sectional shape, lower wall 14 having one or more openings 16 for entry of ambient air, and a similar top wall (not shown) with openings(s) for exit of air which has passed through the unit. Fan 18 is supported within housing 10 to draw air in through openings 16. The air moved by fan 18 will move upwardly through housing 10, as indicated by the arrows, and out through the top wall openings.

Water inlet pipe 20 extends into housing 10 from an appropriate outside water supply. Nozzle 22 on the end of pipe 20 directs the water supply outwardly in a mist or spray of fine droplets preferably a full 360° around the nozzle. Vertical wall 24 forms an open-ended enclosure about nozzle 22, and is spaced an appropriate distance therefrom, to intercept the spray of water droplets. Some of the droplets, of course, may fall without reaching wall 24, but in any case all water which leaves nozzle 22 eventually passes through the open lower end of wall 24. Preferably, wall 24 is cylindrical in cross section, but may take other forms.

A first conical guide in the nature of an inverted, truncated cone or cone frustrum 26 is positioned directly below wall 24 and has a diameter at its upper end at least as great, and preferably slightly greater than, the diameter (or greatest lateral dimension) of wall 24. A second conical guide, in the form of cone frustrum 28, is positioned coaxially with and directly below the open lower end of cone frustrum 26. A third conical guide in the form of inverted cone 30, is likewise positioned with its open upper end directly below the lower end of cone frustrum 28 and coaxially therewith. Cone 30 is in the nature of a funnel with a central drain opening 32 at its lower end communicating with drain pipe 34. The latter passes out of housing 10 to a suitable drain receptacle. Thus, all water which enters in the form of a spray through nozzle 22 is either picked up by the air as water vapor or is drained out through pipe 34.

Since the ends of vertical wall 24 and cone frustrums 26 and 28 are open a portion of the air entering housing 10 will pass through each of these in traveling through the housing. Such air will be directly exposed to the water spraying outwardly from nozzle 22 and falling down through the several guides and will pick up water vapor to a degree dependent on the relative humidity of the ambient air and the velocity of its travel through the unit. As the air and water droplets flow countercurrently, much of the dust and other particulate matter carried by the air will be picked up by the droplets which fall through the guides and are drained from the system. The efficiency of filtering particulate matter will depend largely on the concentration of droplets, i.e., the percentage of the total cross sectional area through which the air passes which is occupied by water at any given time.

Baffle 36 is attached to the outside of vertical wall 24 and extends outwardly toward the inside of wall 12. Plates 38 are pivotally attached to baffle 36 and form a portion of the baffle system defining the space through which air may pass in traveling through housing 10 outside the water-conducting elements. Plates 38 are mechanically attached by any desired conventional means, indicated diagrammatically by dotted line 40, to manual control knob 42. Adjustment of the control knob is effective to vary the positioning of plates 38 and thereby the proportions of air passing inside and outside the water-conducting elements. If the humidifier is to be used under conditions where the proportion of air to be exposed directly to the water spray is always constant, of course, no baffle system would be necessary since the unit would be constructed with the necessary spacing. Normally, it is desirable that at least 50 percent of the air pass through the water spray area. The disclosed system may be turned on and off by a single switch controlling the power supply both to the fan and to a valve or pump in the water supply line. The switch may be operated manually, or automatically in response to sensed level of relative humidity or temperature. It is important to note, however, that the system is, in a sense, self controlling since the rate of moisture addition naturally decreases as the relative humidity of air passing therethrough increases. Thus, the system may be left in continuous operation and controlled only by natural laws of mass transfer. Means may also be easily provided for adding to the water spray metered quantities of deodorizers, fungicides, etc. Virtually all impurities in the water will be drained away and will not build up in a manner which would require frequent cleaning or repair. The system may be used as a separate console-type unit or installed in the plenum chamber of a hot air furnace. Whereas in the disclosed unit the flow of air and water is counter-current; it is also feasible to provide flow in the same direction as, for example, by moving the air downwardly through the housing.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Apparatus for adding moisture to air comprising, in combination:

a. a housing having an air intake at the bottom and an air outlet at the top defining an upwardly directed air flow path;

b. a nozzle centrally positioned in an upper part of said housing to direct a spray of water droplets outwardly substantially 360° around said nozzle;

c. a vertical wall spaced inwardly of said housing and surrounding said nozzle and spaced an appreciable distance therefrom, said spray of water droplets being directed onto the inside of said wall;

d. at least one open ended frusto-conical guide positioned in the air flow path generally coaxially below said vertical wall, the open, upper end of said guide having a diameter at least as great as the greatest transverse dimension of the lower end of said vertical wall; and e. means for draining from said housing water collected in said conical guide.

2. The invention according to claim 1 and further including baffle means for limiting the amount of air which may pass between the outside of said vertical wall and the inside of said housing in traveling between said intake and said outlet.

3. The invention according to claim 2 wherein said baffle means are selectively adjustable to vary said air amount.

4. The invention according to claim 1 wherein a plurality of said guides are provided in vertically spaced relation, each of said guides having an opening through the bottom for passage of water to the next lower guide, said drain means receiving the water from the lowest of said guides.

5. The invention according to claim 4 wherein the lowest of said guides comprises a funnel for directing water into a drain pipe.

6. The invention according to claim 4 wherein the lower ends of all except the lowest of said guides are open for an appreciable diameter to allow passage of a significant amount of the air traveling between said intake and said outlet through said guides.

7. The invention according to claim 6 wherein all of said guides and said vertical wall are axially disposed on the central vertical axis of said housing.

8. The invention according to claim 7 and further including a fan located within said housing adjacent said air intake for drawing air into said housing.

9. The invention according to claim 7 wherein said vertical wall is cylindrical.

* * * * *